(12) United States Patent
Abbas

(10) Patent No.: US 9,300,429 B2
(45) Date of Patent: Mar. 29, 2016

(54) METHOD AND APPARATUS FOR TRANSPORTING A CLIENT SIGNAL OVER AN OPTICAL NETWORK

(71) Applicant: TELEFONAKTIEBOLAGET L M ERICSSON (PUBL), Stockholm (SE)

(72) Inventor: Ghani Abdul Muttalib Abbas, Nottingham (GB)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 209 days.

(21) Appl. No.: 13/806,737

(22) PCT Filed: Dec. 11, 2012

(86) PCT No.: PCT/EP2012/075110
§ 371 (c)(1),
(2) Date: Feb. 26, 2013

(87) PCT Pub. No.: WO2014/015918
PCT Pub. Date: Jan. 30, 2014

(65) Prior Publication Data
US 2014/0161460 A1 Jun. 12, 2014

Related U.S. Application Data

(60) Provisional application No. 61/675,980, filed on Jul. 26, 2012.

(51) Int. Cl.
*H04J 14/02* (2006.01)
*H04B 10/20* (2006.01)
(Continued)

(52) U.S. Cl.
CPC ........... *H04J 14/0256* (2013.01); *H04J 3/1652* (2013.01); *H04J 14/0257* (2013.01); *H04J 14/0273* (2013.01); *H04L 27/2697* (2013.01)

(58) Field of Classification Search
CPC  H04J 14/0256; H04J 14/0257; H04J 14/0273
USPC ....................................... 398/79, 58
See application file for complete search history.

(56) References Cited

U.S. PATENT DOCUMENTS 7,539,196 B2 * 5/2009 Flavin ................... H04J 3/1611
370/394
7,876,785 B2 * 1/2011 Lautenschlaeger ... H04J 3/1617
370/252
(Continued)

FOREIGN PATENT DOCUMENTS

EP          1176745 A2      1/2002

OTHER PUBLICATIONS

Masahiko Jinno et al., "Spectrum-Efficient and Scalable Elastic Optical Path Network: Architecture, Benefits, and Enabling Technologies" Nov. 2009.*

(Continued)

*Primary Examiner* — Ken Vanderpuye
*Assistant Examiner* — Abbas H Alagheband
(74) *Attorney, Agent, or Firm* — Nicholson De Vos Webster & Elliott LLP

(57) ABSTRACT

A method of transporting a client signal across an optical transport network (OTN) comprises dividing a received client signal into a plurality of parallel signals at a lower bit rate. The parallel signals are mapped into a respective number of optical data units (ODUs), each ODU having payload bytes and overhead bytes. Each ODU is mapped into a respective optical transport unit (OTUs) having payload bytes and overhead bytes. The OTUs are transmitted across respective optical carriers of a super-channel, the optical carriers of the super-channel being synchronously modulated. Optical channel control information is inserted into the overhead bytes of the ODU and/or OTU. The optical channel control information is used to manage and/or control the transport of the client signal using the super-channel.

14 Claims, 20 Drawing Sheets

(51) Int. Cl.
H04J 3/16 (2006.01)
H04L 27/26 (2006.01)

(56) References Cited

U.S. PATENT DOCUMENTS

| | | | | |
|---|---|---|---|---|
| 8,446,906 | B2* | 5/2013 | Sprague | H04J 3/1652 370/392 |
| 8,542,708 | B1* | 9/2013 | Mok | H04J 3/0685 370/503 |
| 8,817,824 | B2* | 8/2014 | Connolly | H04J 3/1652 370/477 |
| 9,019,997 | B1* | 4/2015 | Mok | H04B 10/07 370/503 |
| 2004/0062277 | A1* | 4/2004 | Flavin | H04J 3/1611 370/474 |
| 2004/0228635 | A1* | 11/2004 | Price | H04B 10/2575 398/149 |
| 2007/0071443 | A1* | 3/2007 | Fukumitsu | H04J 3/1611 398/79 |
| 2007/0269218 | A1* | 11/2007 | Zhang | H04J 3/1652 398/140 |
| 2009/0154475 | A1* | 6/2009 | Lautenschlaeger | H04J 3/1617 370/400 |
| 2009/0169217 | A1* | 7/2009 | Meagher | H04J 3/047 398/140 |
| 2010/0040370 | A1* | 2/2010 | Aoki | H04J 3/1652 398/58 |
| 2010/0142947 | A1* | 6/2010 | Shin | H04J 3/1652 398/43 |
| 2010/0272438 | A1* | 10/2010 | Conklin | H04J 3/1652 398/58 |
| 2011/0004700 | A1* | 1/2011 | Sprague | H04J 3/1652 709/236 |
| 2011/0274427 | A1* | 11/2011 | Madrahalli | H04J 3/1652 398/58 |
| 2012/0051745 | A1* | 3/2012 | Srinivasan | H04L 45/125 398/58 |
| 2012/0106948 | A1* | 5/2012 | Moynihan | H04J 3/1611 398/10 |
| 2013/0004168 | A1* | 1/2013 | Ohara | H04J 3/0638 398/43 |
| 2013/0011138 | A1* | 1/2013 | Kim | H04B 10/616 398/79 |
| 2013/0121685 | A1* | 5/2013 | Rao | H04J 14/0212 398/17 |
| 2013/0142509 | A1* | 6/2013 | Connolly | H04J 3/1652 398/44 |
| 2013/0230316 | A1* | 9/2013 | Hussain | H04J 14/0272 398/34 |

OTHER PUBLICATIONS

S. Chandrasekhar et al., "Terabit Superchannels for High Spectral Efficiency Transmission," Sep. 19-23, 2010, 6 pages, ECOC 2010, Torrino, Italy.

PCT International Search Report and Written Opinion for PCT/EP2012/075110, Apr. 5, 2013, 6 pages.

"Interfaces for the Optical Transport Network (OTN)", SERIES G: Transmission Systems and Media, Digital Systems and Networks, Digital terminal equipments—General, SERIES Y: Global Information Infrastructure, Internet Protocol Aspects and Next-Generation Networks, Internet protocol aspects—Transport, International Telecommunication Union, Recommendation ITU-T G.709/Y.1331, Dec. 2009, 218 pages.

Fang, Chao, et al., "A Novel Scheme for Realization of Flexible ODU Hitless Resizing", Photonics and Optoelectronic (SOPO), 2010 Symposium, IEEE, Jun. 19, 2010, 4 pages.

Jinno, Masahiko, et al., "Spectrum-Efficient and Scalable Elastic Optical Path Network: Architecture, Benefits, and Enabling Technologies", Topics in Optical Communications, IEEE Communications Magazine, Nov. 2009, pp. 66-73.

Syed, Sharfuddin, et al., "A Framework for Control of Flex Grid Networks", draft-syed-ccamp-flexgrid-framework-ext-01.txt, Network Working Group, Internet Draft, Apr. 23, 2012, 17 pages.

Tomizawa, Masahito, et al., "Terabit LAN with Optical Virtual Concatenation for Grid Applications with Super-Computers", 2005 Optical Fiber Communications Conference Technical Digest, IEEE, vol. 4, Mar. 6, 2005, 3 pages.

"Spectral grids for WDM applications: DWDM frequency grid", SERIES G: Transmission Systems and Media, Digital Systems and Networks, ITU-T, G.694.1, Feb. 2012, 16 pages.

"Spectral grids for WDM applications: CWDM wavelength grid" SERIES G: Transmission Systems and Media, Digital Systems and Networks, ITU-T G.694.2, Dec. 2003, 12 pages.

"Interfaces for the optical transport network", SERIES G: Transmission Systems and Media, Digital Systems and Networks, ITU-T G.709/Y.1331, Feb. 2012, 238 pages.

* cited by examiner

METHOD AND APPARATUS FOR TRANSPORTING A CLIENT SIGNAL OVER AN OPTICAL NETWORK

CROSS-REFERENCE TO RELATED APPLICATIONS

This application is a National stage of International Application No. PCT/EP2012/075110, filed Dec. 11, 2012, which claims priority to U.S. Patent Application No. 61/675,980, filed Jul. 26, 2012, which are hereby incorporated by reference.

TECHNICAL FIELD

This invention relates to optical transport networks and to methods and apparatus therefore.

BACKGROUND

Currently, the data traffic transported over the telecom optical transport networks is growing at a phenomenal pace and consequently the transmitted bit rates over a single optical wavelength in a DWDM transport systems are increasing rapidly. It is expected soon that the standardized 100 Gb/s bit rate will not meet the need and a higher digital rate is required.

Currently, transport equipment is designed with standardized interfaces and DWDM interfaces where multiple optical wavelengths are used to transport various digital bit rates. International Telecommunications Union (ITU-T) Recommendation G.709 defines the optical transport network (OTN) interfaces and hierarchy. G.709 also defines the largest container ODU4 to transport 100 Gbit/s of data traffic.

Standards for the transport of data traffic greater than 100 Gbit/s, for example 400 GBit/s or greater, are not yet defined.

SUMMARY

In one aspect there is provided a method of transporting a client signal across an optical transport network (OTN), the method comprising dividing a received client signal into a plurality of parallel signals at a lower bit rate; mapping the parallel signals into a respective number of optical data units (ODU) each having payload bytes and overhead bytes; mapping each ODU into a respective optical transport unit (OTU) having payload bytes and overhead bytes; transmitting the OTUs across respective optical carriers of a super-channel, the optical carriers of the super-channel being synchronously modulated; and inserting optical channel control information (OCCI) into the overhead bytes of the ODU and/or OTU, the OCCI being used to manage and/or control the transport of the client signal using the super-channel.

The use of super-channels together with in-band control and management signaling allows for increased transport capacity with minimum modifications to much existing transport equipment.

The OTN, ODU, OTU and the optical carriers of the super-channel may be constructed according to ITU-T standard G.709. Other types of containers (ODU/OTU) are however contemplated.

The super-channel may be transmitted using a single laser. The super-channel may consist of multiple frequency-locked carriers using coherent optical orthogonal frequency-division multiplexing (CO-OFDM), however other types of modulation may alternatively be used.

The OCCI may be used to identify which optical carriers are used to carry the respective OTU, and may also include information about structure, types, and management information about the signal/s transported.

The OCCI may be used to request a change in the optical carriers used to transport the client signal. This may include adding or subtracting sub-carriers, or re-allocating the same number of sub-carriers.

In a second aspect there is provided a method of transporting a client signal across an optical transport network (OTN), the method comprising: dividing a received client signal into a plurality of parallel signals at a lower bit rate; mapping the parallel signals into a respective number of optical data units (ODU) each having payload bytes and overhead bytes; mapping each ODU into a respective optical transport unit (OTU) having payload bytes and overhead bytes; mapping the resulting OTUs into a higher bit rate OTU having payload bytes and overhead bytes; transmitting the higher rate OTU across the OTN as an optical super-carrier, the optical super-carrier having a wavelength wider than the wavelength of an optical carrier normally allocated to transmitting a lower rate OTU across the OTN; inserting optical channel control information (OCCI) into the overhead bytes of the ODU and/or OTU, the OCCI being used to manage and/or control the transport of the client signal using the optical super-carrier.

The OTN, ODU, and OTU may operate according to G.709. The lower rate ODU and OTU may be ODU4 and OTU4 respectively, whilst the higher rate OTU may be OTU5.

The lower bit rate OTU may first be interleaved to form a single higher bit rate signal for mapping into the higher bit rate OTU. The interleaving may be performed using bit, byte or block interleaving. Circuit processing may be used to de-skew/align the signals.

In an embodiment, the optical carriers have a wavelength defined in ITU Recommendations G.694.1 and G.694.2 and the optical super-carrier has a wavelength wider than what would be used for the optical carriers.

The use of super-carriers together with in-band control and management signaling allows for increased transport capacity without modifications to much existing transport equipment.

In a third aspect there is provided a method of transporting a client signal across an optical transport network (OTN), the method comprising: dividing a received client signal into a plurality of parallel signals at a lower bit rate; mapping the parallel signals into a respective number of optical data units (ODU) each having payload bytes and overhead bytes; mapping each ODU into a respective optical transport unit (OTU) having payload bytes and overhead bytes; transmitting the OTUs across respective optical carriers; inserting optical channel control information (OCCI) into the overhead bytes of the ODU and/or OTU, the OCCI being used to request a change in the optical carriers used to transport the client signal.

The OTN, ODU, OTU may operate according to G.709. The optical carriers may be formed as part of a super-channel or as standard parallel wavelengths as defined in G.709, G.694.1 and G.694.2.

The use of in-band signaling to change the number of optical carriers used to transport the client signal allows for increased flexibility for handling the client signal.

There are also provided corresponding methods of receiving the optical channels and recovering the inserted OCCI. As noted, this may be used to assist in fully recovering all of the client signal, to manage the transport network, to control changes in the number and/or assignment of optical carriers used for transport of the client signal.

These methods can occur at a client signal ingress and egress node, as well as at intermediate nodes within the OTN.

There are also provided equipment such as optical nodes having optical-electrical-optical (OEO), optical-electrical (OE), electrical-optical (EO) capability which are arranged to carry out these methods. Similarly there are also provided computer code on a suitable carrier and executable by a suitable processor to carry out the above methods.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
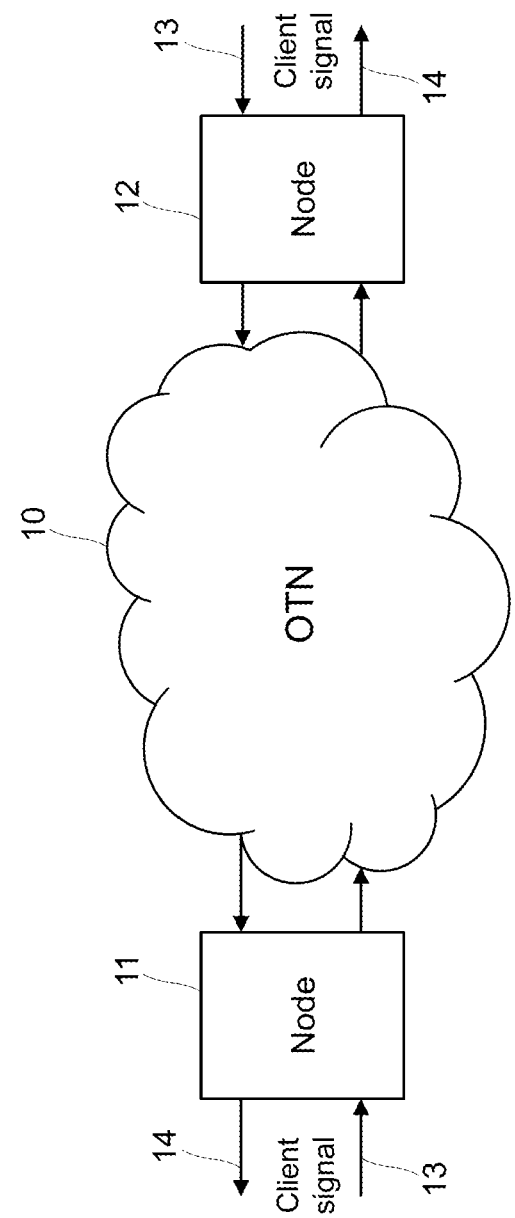
FIG. 1 shows an Optical Transport Network (OTN)

FIG. 1 shows an OTN network 10 and two nodes 11, 12 forming part of the OTN network 10 at which client signals can ingress 13 the OTN network and/or egress 14 the OTN network 10.

Figure 2A:
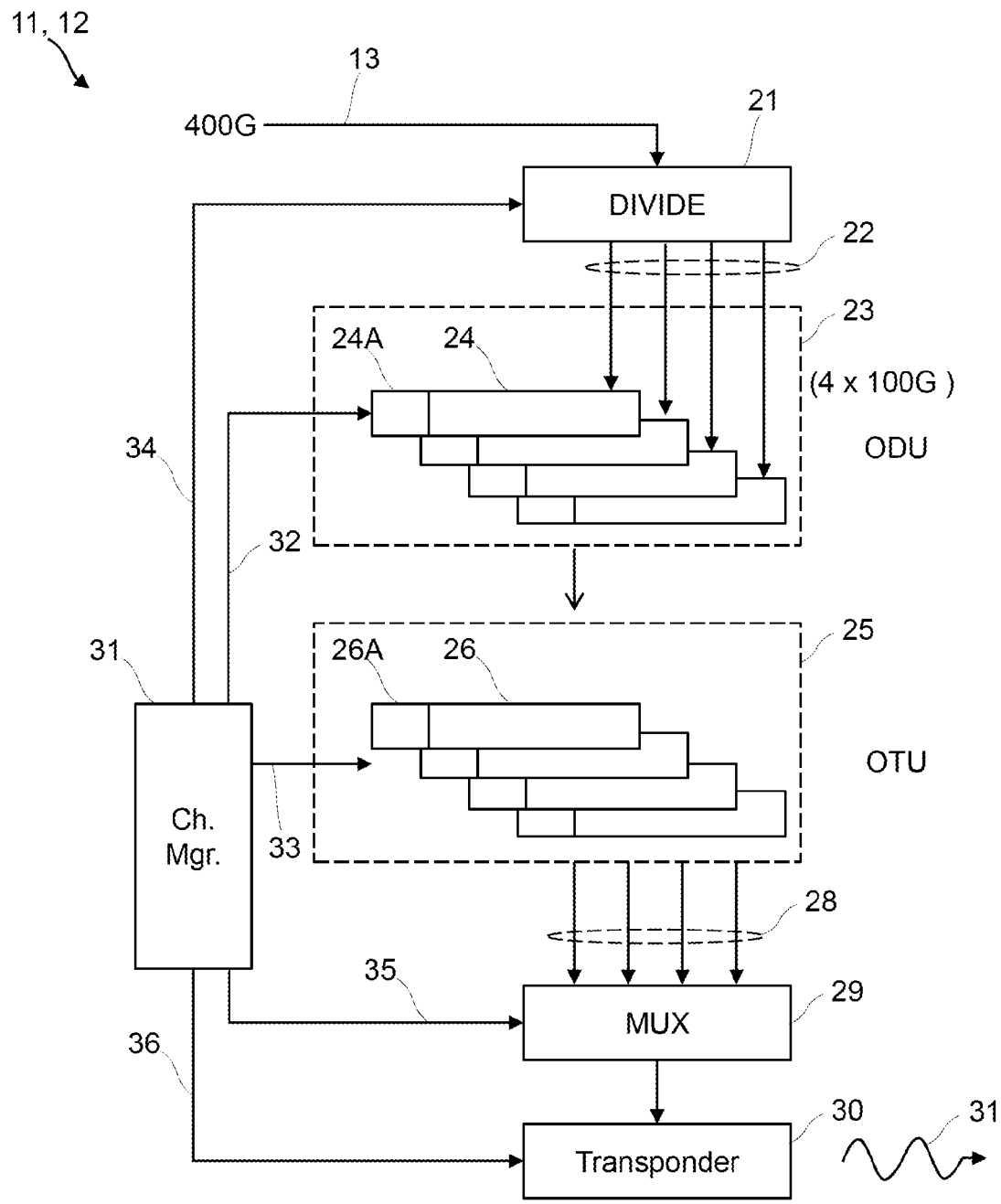
FIGS. 2A and 2B show apparatus at a first node and a second node of FIG. 1 where client traffic is carried using a super-channel.
Figure 2B:
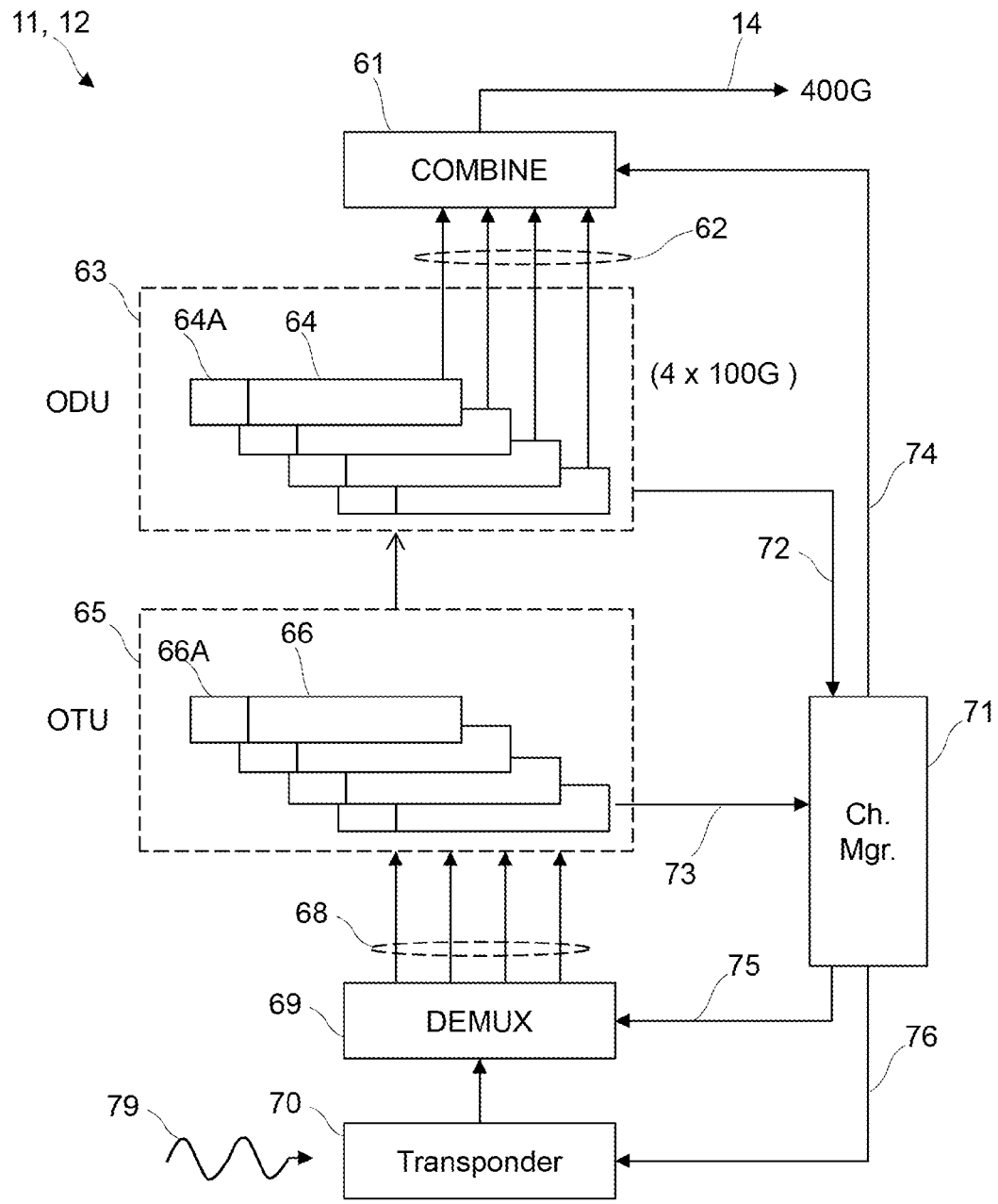

FIGS. 2A and 2B show one embodiment of apparatus at the nodes 11, 12 of FIG. 1 in more detail. FIG. 2A shows ingress functions at one of the nodes 11, 12. The node receives a 400 G client signal 13 and uses a demultiplexer/divider 21 to demultiplex/divide the client signal 13 into four parallel 100 G signals 22 which are mapped by a mapper 23 into ODU4 containers 24 as will be appreciated by those skilled in the art. For simplicity of explanation, not all steps of this process are described, however detailed explanations of these steps can be found in ITU-T standard G.709.

As will be appreciated by those skilled in the art, ODU4 containers 24 are able to transport 100 G client signals across the OTN network 10, and thus the embodiment is able to transport the 400 G client signal 13 across four parallel ODU4 signals. The ODU4 containers 24 are mapped by a further mapper 25 into OTU4 containers 26 as is known. A channel managing entity 31 inserts 32, 33 optical channel control information into the overhead bytes 24A, 26A of the ODU4 and/or OTU4 containers 24, 26. The channel managing entity 31 may be implemented by a suitably programmed processor and memory in the node 11, 12.

The set 28 of OTU4 signals are input to a super-channel multiplexer 29 which cooperates with a super-transponder 30 to generate an optical signal 31 comprising a group of optical sub-carriers or channels to transport the OTU4 containers across the OTN 10. A super-channel can comprise a group of optical carriers which are synchronously modulated. In this example, four sub-carriers or wavelengths are used which correspond to the four parallel OTU4 streams. Various modulation schemes may be used such as QAM, QPSK, 16QPSK, etc. The sub-carriers may be further multiplexed to form part of a DWDM transport system.

The super-channel multiplexer 29 and super-channel transponder 30 can be implemented in various ways as will be appreciated by those skilled in the art. The Infinera DTN-X platform is a current commercially available product.

In one implementation, the optical carriers are modulated synchronously which provides improved optical performance. Such an implementation is described in the paper "Terabit Superchannels for High Spectral Efficiency Transmission" by S. Chandrasekhar and Xiang Liu, in ECOC 2010, 19-23 Sep., Torino Italy. The implementation described in this paper uses coherent optical orthogonal frequency division multiplexing (CO-OFDM), however alternative super-channel implementations could also be used.

The super-channel mux 29 and super-transponders 30 effectively integrate what would otherwise be the modulation of separate optical channels or wavelengths. The use of photonic integration has allowed the implementation of super-channels or groups of multiple wavelengths to be modulated together in a cost effective manner.

FIG. 2B shows apparatus at a node 11, 12 for egress of a client signal. A corresponding arrangement receives the four optical signals which form the super-channel 79 and recovers 69 the 4x OTU4 streams 68, which are demapped 65 into 4x ODU4 streams. A channel manager entity 71 recovers optical channel control information 73, 72 from the overheads 66A, 64A of the OTU4 and/or ODU4 66, 64. A transponder 70 receives the optical signal 79 which comprises the super-channel. A demultiplexer 69 recovers the OTU4 streams 68. The OTU4 streams are demapped 65 to ODU4 streams 64. A set 62 of output signals recovered from the ODU4s are combined 61 and output as a client signal 14.

Figure 2C:
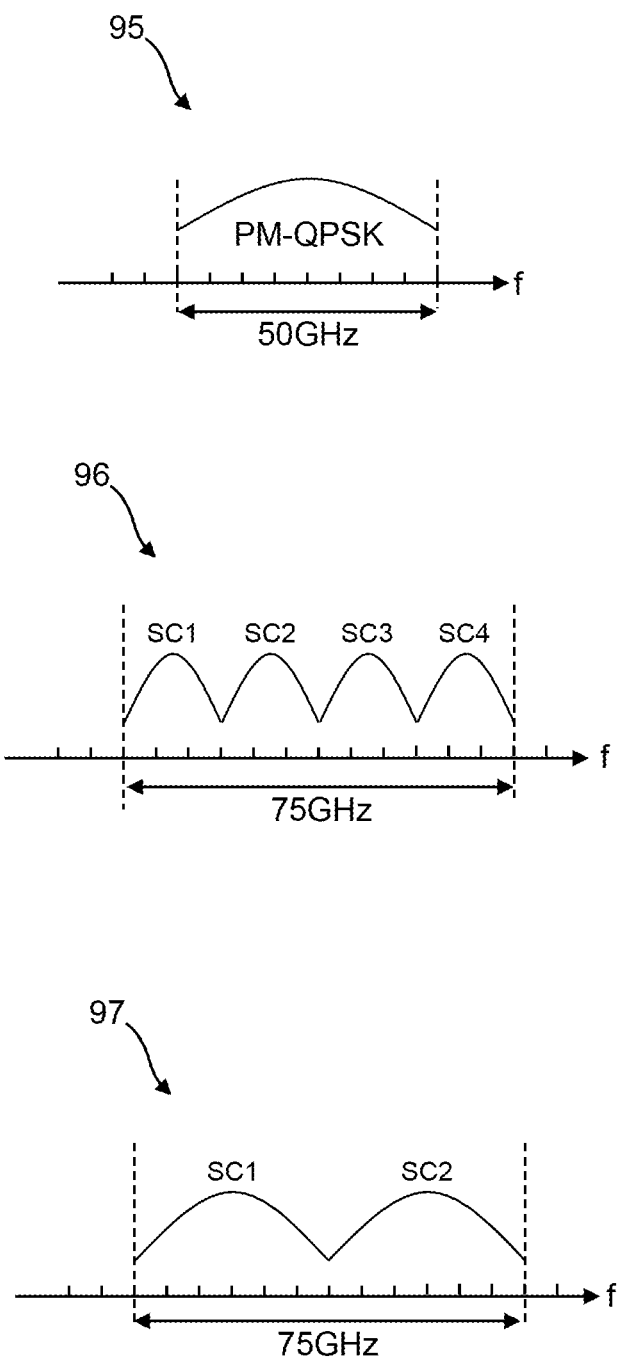
FIG. 2C shows two examples of super-channel signals and a conventional 100 G signal.

FIG. 2C shows two examples 96, 97 of 400 G super-channel signals and, by way of contrast, a conventional 100 G signal 95. The super-channel signal 96 shown in FIG. 2C is of the type described above. It comprises four sub-carriers SC1, SC2, SC3, SC4. The super-channel signal 97 comprises two sub-carriers SC1, SC2. As can be seen from these examples, the number of sub-carriers and the bandwidth of each sub-carrier can vary. Modulation scheme can be selected from a range of possible modulation schemes. A different modulation scheme may be used for one or more of the sub-carriers in the plurality of sub-carriers.

In this embodiment, the number of sub-carriers of the super-channel and their particular wavelengths are referred to as the optical channels structure. The optical channel control information may include requests to change the optical channels structure used to transport the client signal. For example, should the client wish to increase the client signal from 400 G to 500 G, this may be accommodated by adding a fifth parallel OTU4 signal and corresponding optical sub-carrier. Alternatively, it may be necessary to change which sub-carriers are used (without changing their number) due to operational network considerations such as protection switching or congestion. In this case one or more of the OTU4 streams may need to be switched to a different optical sub-carrier.

Management information relating to the optical channels structure is communicated between nodes using optical channel control information (OCCI) which is inserted into and recovered from the overhead bytes of the ODU and/or OTU containers as will be described in more detail below. This management information may include the number of optical carriers used in the super-channel, their identities and other management information which would be familiar to those skilled in the art of optical transport network technologies. Alternatively or additionally, the OCCI may include requests, acknowledgements and other hand-shaking messages in order to control a change in the optical channels structure, such as adding or subtracting optical carriers from the super-channel.

Figure 3:
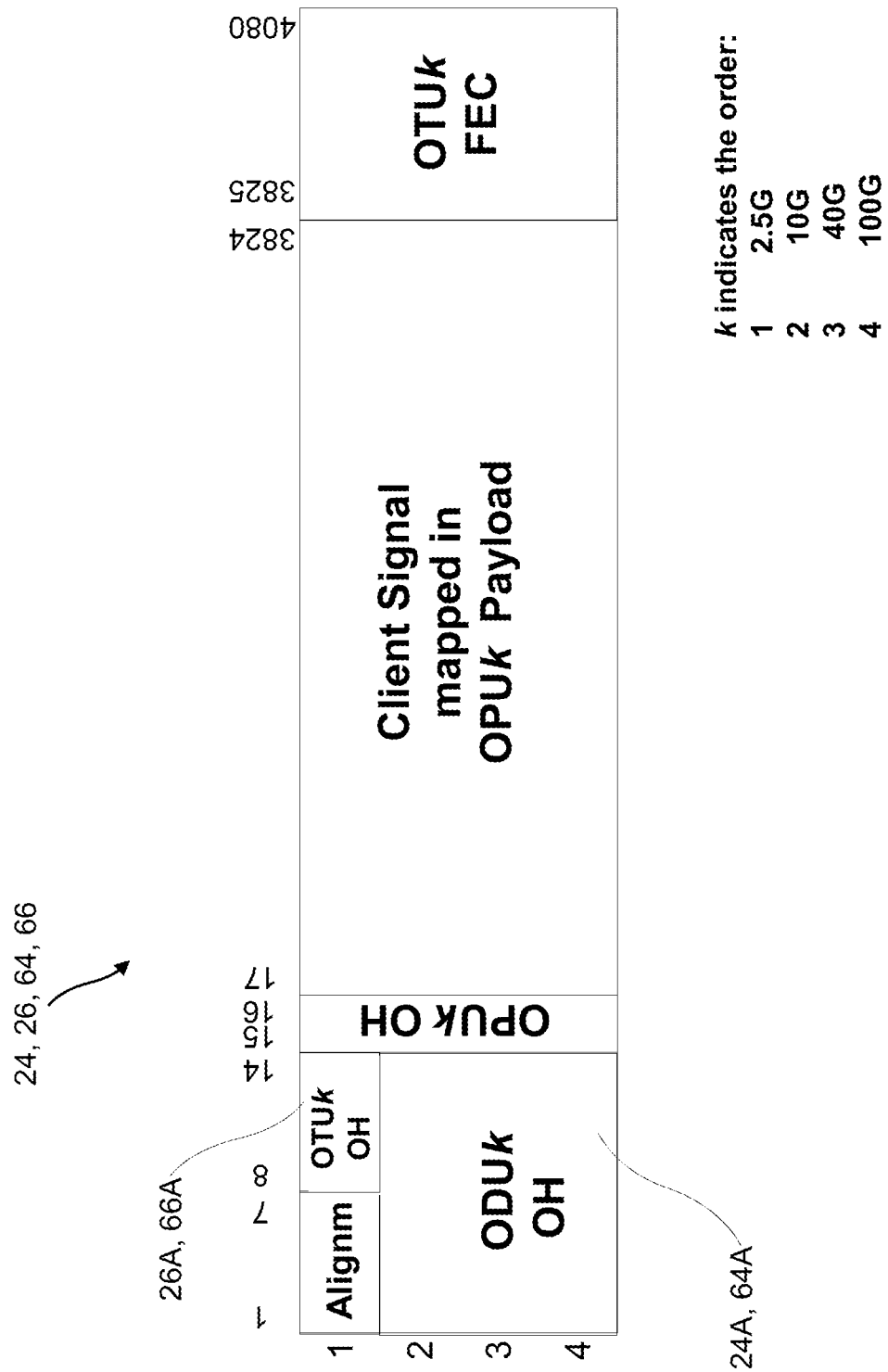
FIG. 3 shows an OTU frame structure.
Figure 4:
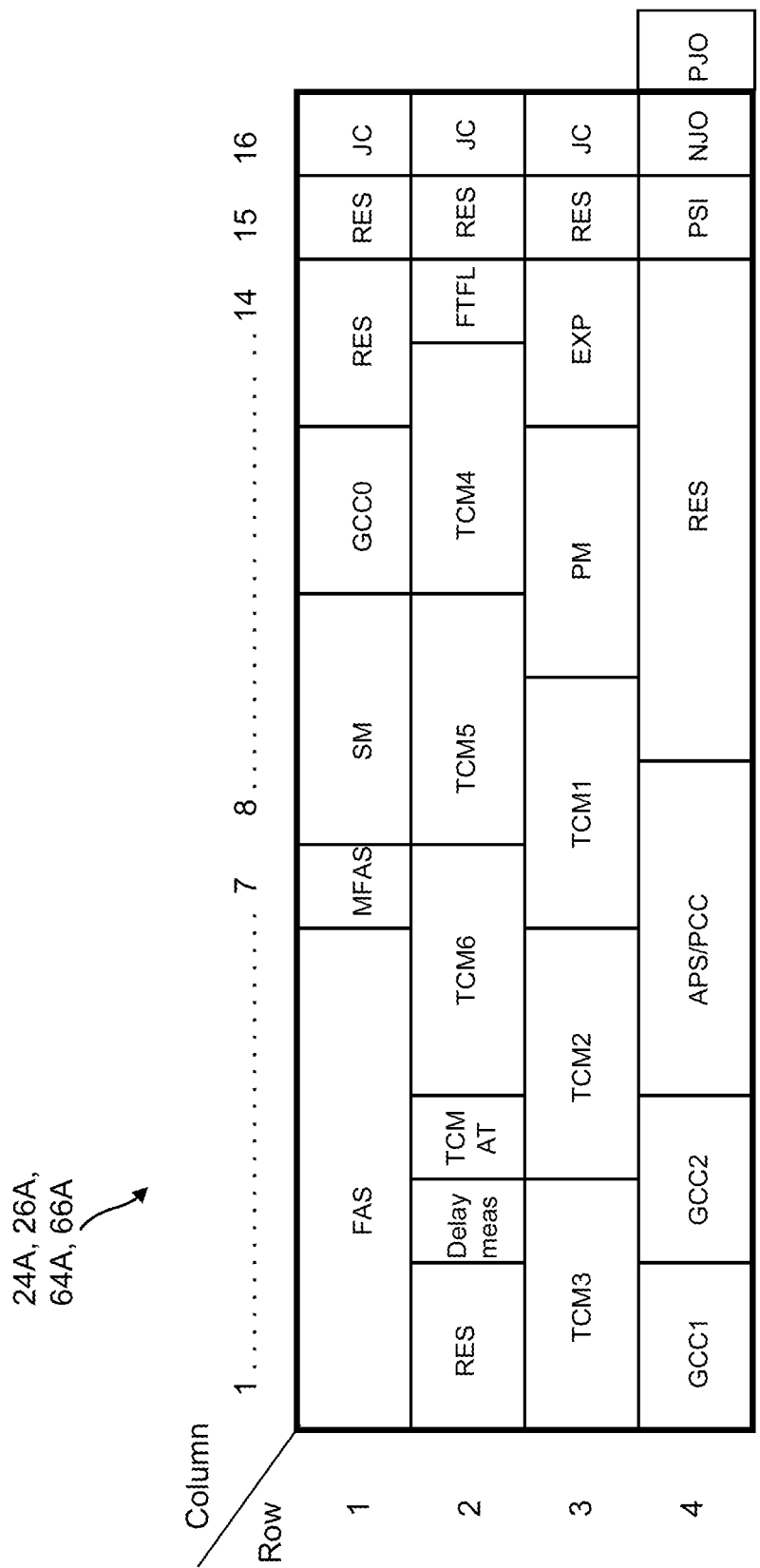
FIG. 4 shows the overhead bytes of the OTU frame of FIG. 3.

The optical channel control information (OCCI) may be distributed in the overhead 24A, 26A of the ODU and OTU in any suitable manner. The information may be in the overhead of just one of the parallel streams of ODU/OTU or in any number of the parallel streams of ODU/OTN in any combination of unique or redundant formats. FIG. 3 shows a standard OTUk frame structure which includes both OTUk OH (overhead) and ODUk OH as indicated. The client signal is mapped into the OPUk payload area as known and as indicated in the figure. FIG. 4 shows the structure of the OH bytes 24A, 26A in more detail, where the acronyms represent:

ACT: Activation/deactivation control channel;
APS: Automatic Protection Switching coordination channel;
EXP: Experimental;
FAS: Frame Alignment Signal;
FTFL: Fault Type & Fault Location reporting channel;
GCC: General Communication Channel;
MFAS: MultiFrame Alignment Signal;
PCC: Protection Communication Control channel;
PJO: Positive Justification Opportunity;
PM: Path Monitoring;
PSI: Payload Structure Identifier;
RES: Reserved for future international standardisation;
SM: Section Monitoring;
TCM: Tandem Connection Monitoring.

In an example embodiment reserved bytes 9-14 in row 4 of the ODU OH could be used, as could reserve bytes 13, 14 in row 1 of the OTU OH. Other ODU and/or OTU OH bytes might also or alternatively be used.

Figure 5:
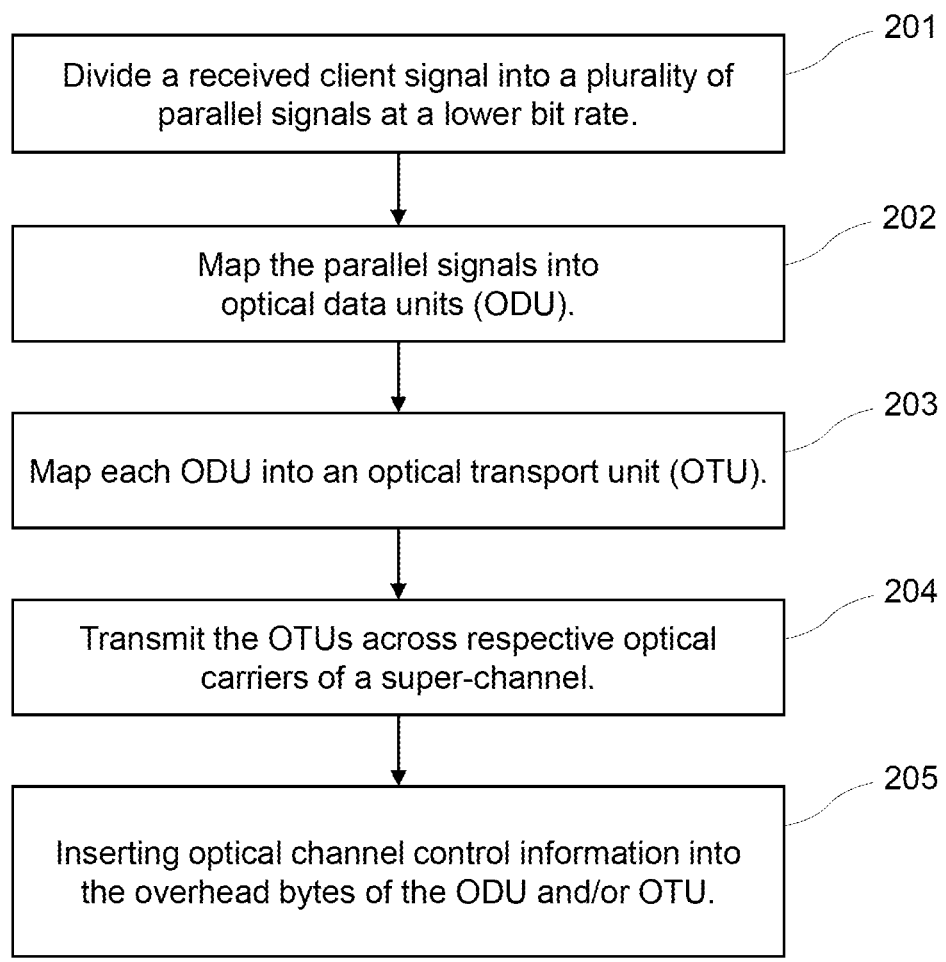
FIG. 5 shows a method which can be performed at the first node of FIG. 2A.

A method of transporting a client signal across an optical transport network (OTN) is shown in FIG. 5. The method can be performed by one of the nodes 11, 12. Step 201 comprises dividing a received client signal into a plurality of parallel signals at a lower bit rate. Step 202 comprises mapping the parallel signals into a respective number of optical data units, ODU, each having payload bytes and overhead bytes. Step 203 comprises mapping each ODU into a respective optical transport unit, OTU, having payload bytes and overhead bytes. Step 204 comprises transmitting the OTUs across respective optical carriers of a super-channel, the optical carriers of the super-channel being synchronously modulated. Step 205 comprises inserting optical channel control information into the overhead bytes of the ODU and/or OTU, the optical channel control information being used to manage and/or control the transport of the client signal using the super-channel.

Figure 6:
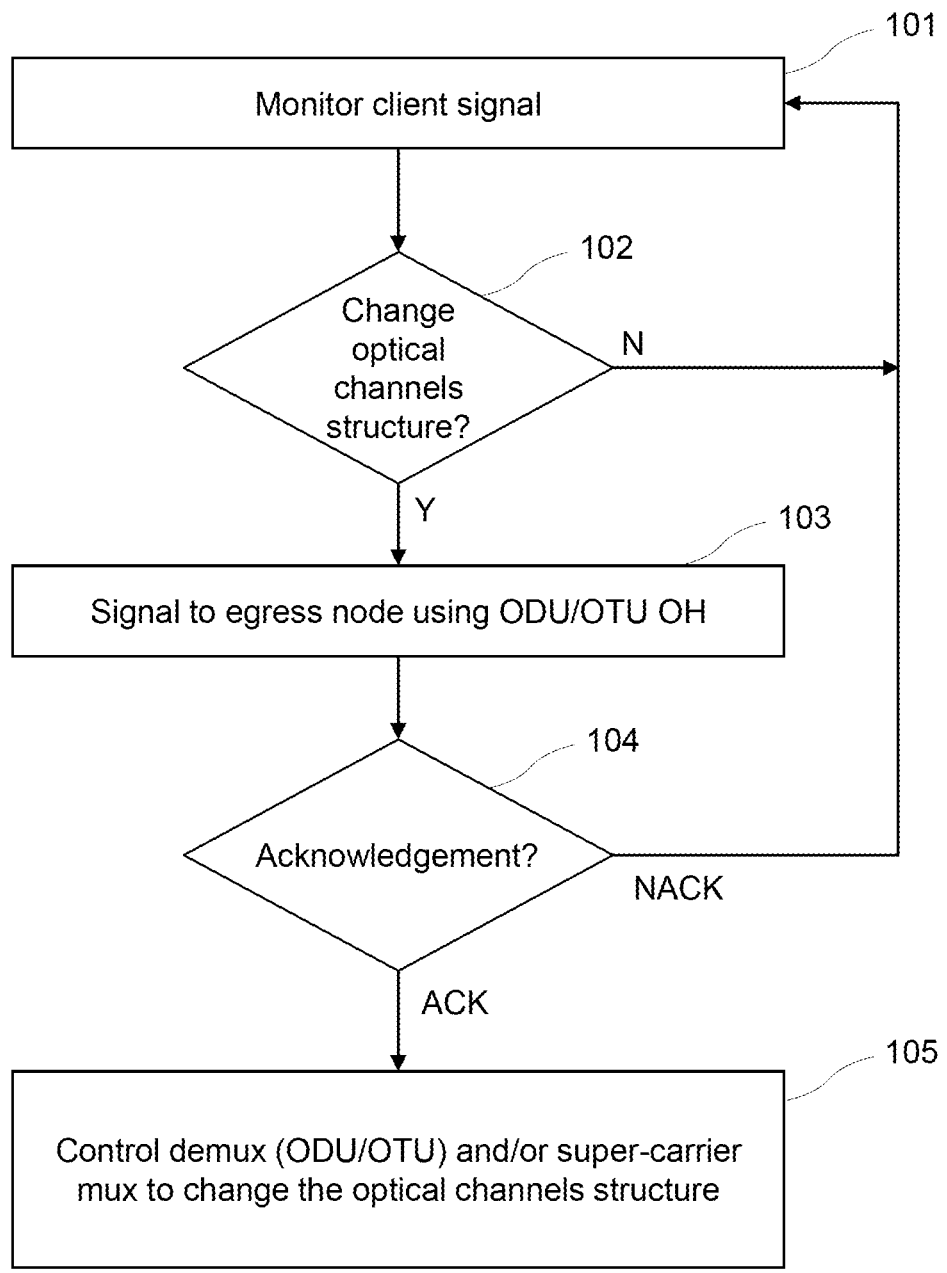
FIG. 6 shows a method of changing the optical channels structure according to an embodiment.

A method of implementing a change in the optical channels structure is illustrated in FIG. 6. A step 101 can monitor the client signal. The client may indicate a need for a higher (e.g. 500 G) or lower (e.g. 300 G) rate signal, or the network may indicate a need to change the particular optical wavelengths to be used for transport. Step 102 determines if a change to the optical channel structure is needed. If a need for such a change to the optical channels structure arises, then suitable OCCI is inserted into the ODU/OTU OH 24A, 26A, 64A, 66A at step 103. For example, if an additional wavelength is required to transport an increased bit rate 500 G client signal instead of the current 400 G signal, then predetermined "add wavelength" and "wavelength=21" type commands can be inserted into byte 13 of row 1 of the OTU OH 26A, 66A, for example. The wavelength=21 will most likely correspond to a wavelength adjacent the wavelengths transporting the current client signal, but need not be so limited. The method, which will be implemented by the channel manager, then awaits an acknowledgement from the second node or receiver.

The second node recovers the OCCI, and if it can receive the suggested optical signal and accommodate the addition OTU4 stream, will provide a positive acknowledgement signal, again typically using the ODU/OTU OH of optical signals in the reverse direction.

Step 104 determines if an acknowledgement is received from the second node. Once the acknowledgement is received, the channel manager of the first egress node sends a control signal (34) to the demux 22 to demultiplex to five parallel 100 G streams which are then mapped into five ODU4 and five OTU4. The channel manager 31 also controls 35 the super-channel mux 29 to generate a super-channel to accommodate the five OTU4 and controls 36 the super-transponder 30 to generate the corresponding five sub-wavelength optical channels.

Various other dynamic control operations can be achieved in this way, for example to reduce the number of optical carriers used (if the client signal rate reduces for example) or to change which wavelengths are used. The OCCI channel may also be used to send other commands, acknowledgements or implement other control operations.

Similarly, various static control information can also be transferred across the optical link for example confirming which optical channels and modulation types are being used.

Figure 7:
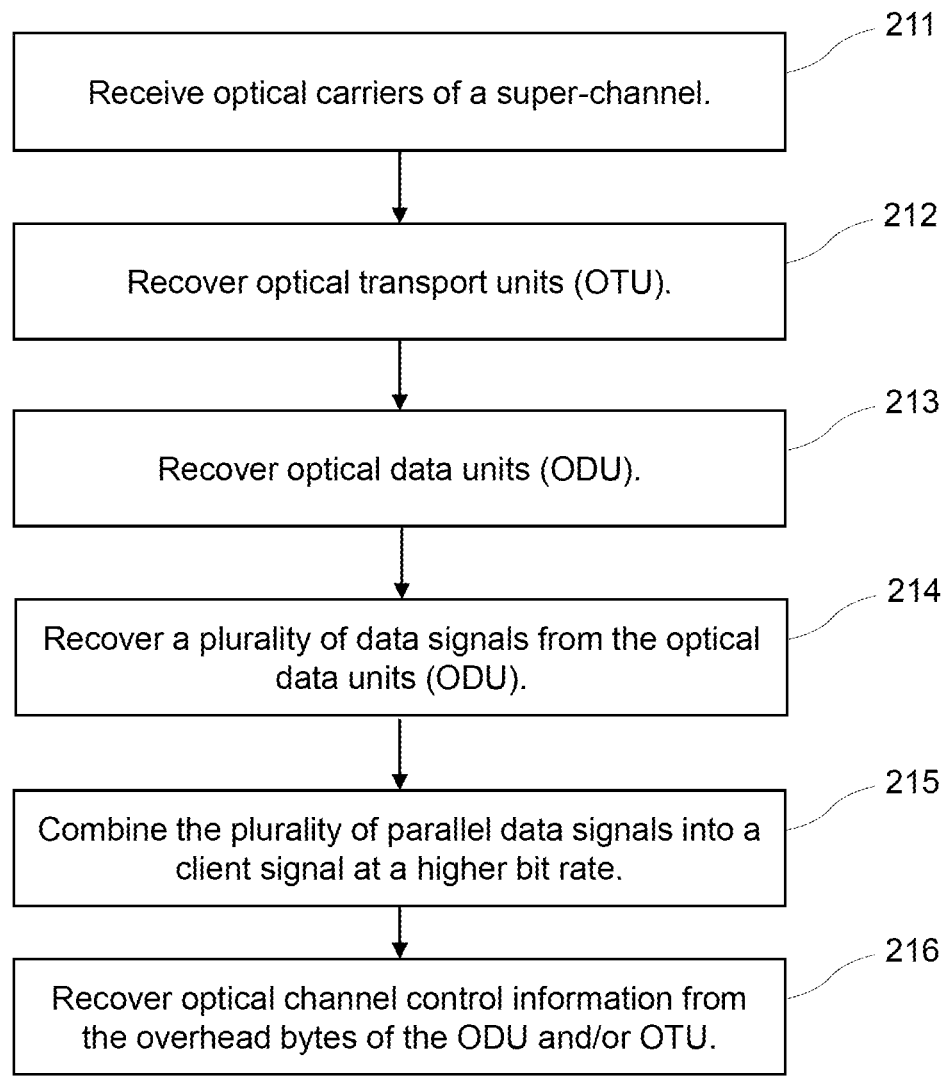
FIG. 7 shows a method which can be performed at the second node of FIG. 2B.

A method of receiving a signal from an optical transport network (OTN) is shown in FIG. 7. The method can be performed by one of the nodes 11, 12. Step 211 comprises receiving optical carriers of a super-channel, the optical carriers of the super-channel being synchronously modulated. Step 212 comprises recovering optical transport units, OTU, each having payload bytes and overhead bytes. Step 213 comprises recovering optical data units, ODU, each having payload bytes and overhead bytes. Step 214 comprises recovering a plurality of parallel data signals from the ODUs. Step 215 comprises combining the plurality of parallel data signals into a client signal at a higher bit rate. Step 216 comprises recovering optical channel control information from the overhead bytes of the ODU and/or OTU, the optical channel control information being used to manage and/or control the transport of the client signal using the super-channel.

Figure 8A:
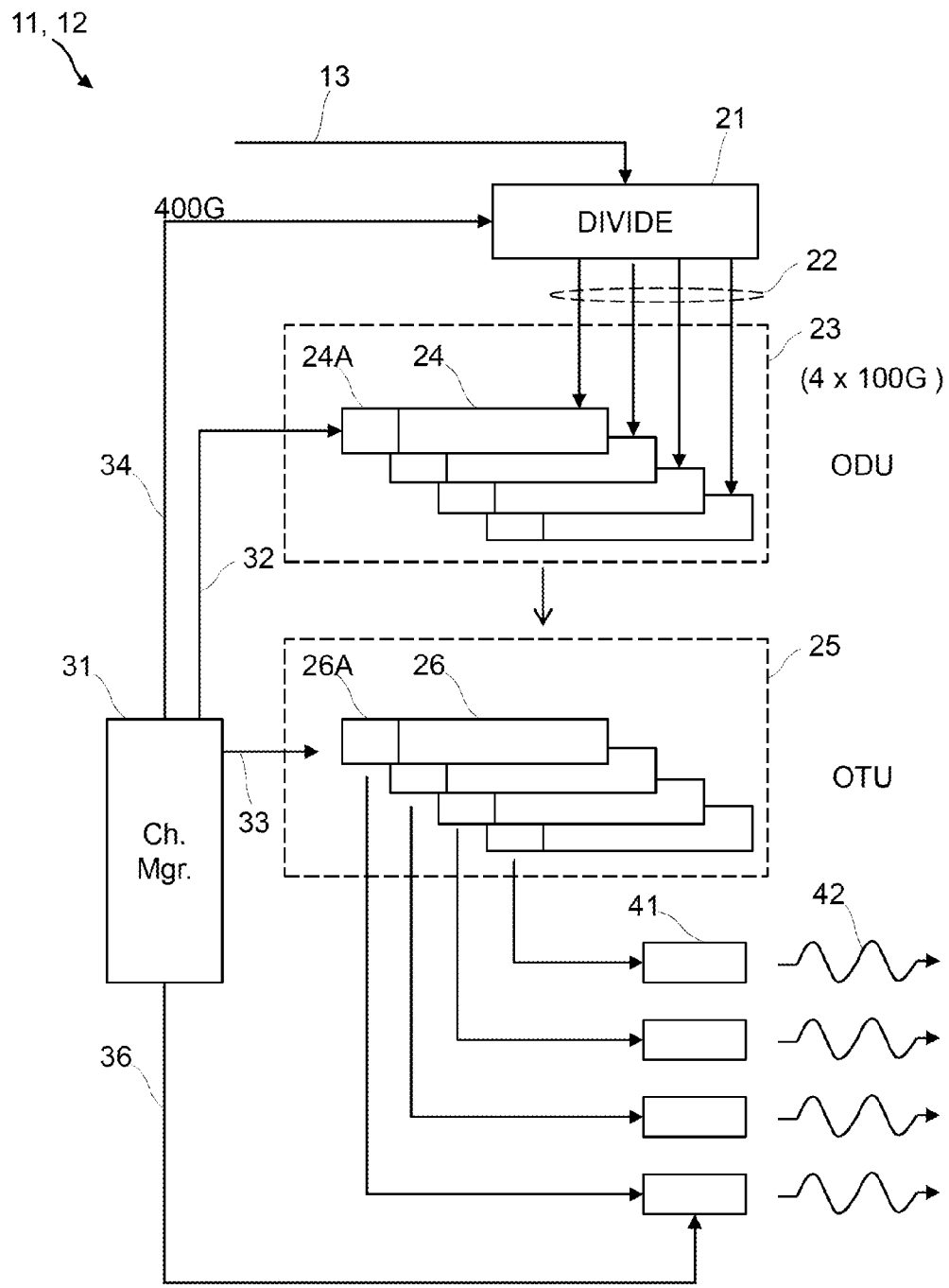
FIGS. 8A and 8B show apparatus at a first node and a second node of FIG. 1 where client traffic is carried using DWDM channels.
Figure 8B:
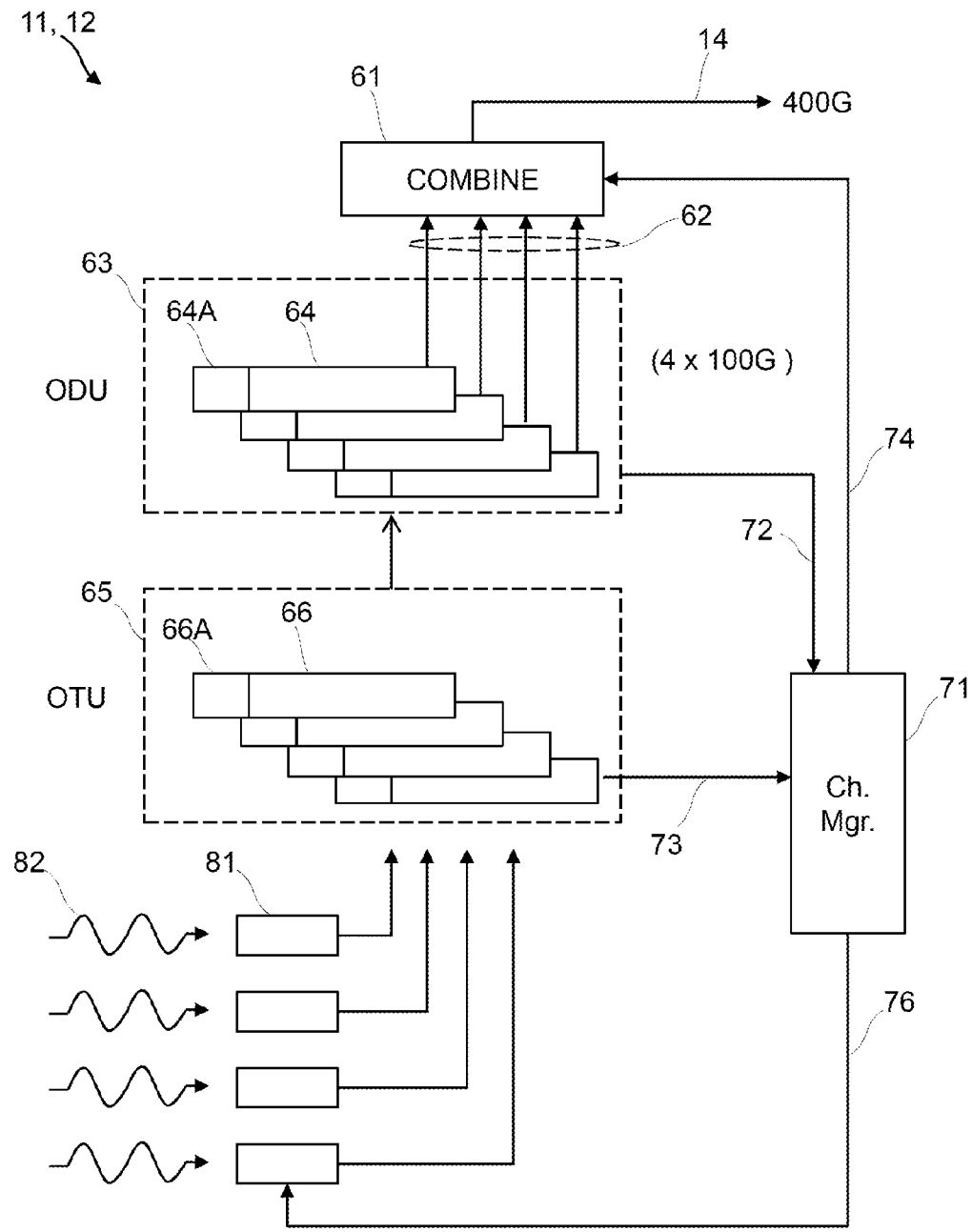

FIGS. 8A and 8B show an alternative embodiment which does not use super-channels but utilises the standard OTN/DWDM system of optical channels which are modulated separately (e.g. using OCh4) and then optically multiplexed to generate a DWDM signal. The initial stages of this embodiment are the same as described for the previous embodiment, and common reference numerals are used to indicate similar features. In this arrangement, each OTU4 is mapped into a respective OCh4 which is used to modulate 41 a respective separate laser. Four parallel optical wavelengths 42 are then used to transport the client signal across to the egress node. The process including the demux/divide 22 is still controlled by the channel manager entity 31 which inserts OCCI into the ODU and/or OTU OH 24A, 26A. FIG. 8B shows apparatus at a second node 12 which receives the optical signal. In a corresponding manner, the second node 12 receives the four optical wavelengths 82 and recovers the four parallel OTU4 streams according to the G.709 standard. These containers are demapped into four ODU4 64 which are fed to the mux/combiner 61 to reconstitute the client signal 14. Any de-skewing processing can also be carried out. The channel manager 71 of the second node 12 recovers 72, 73, the OCCI from the ODU/OTU OH 64A, 66A.

Figure 9:
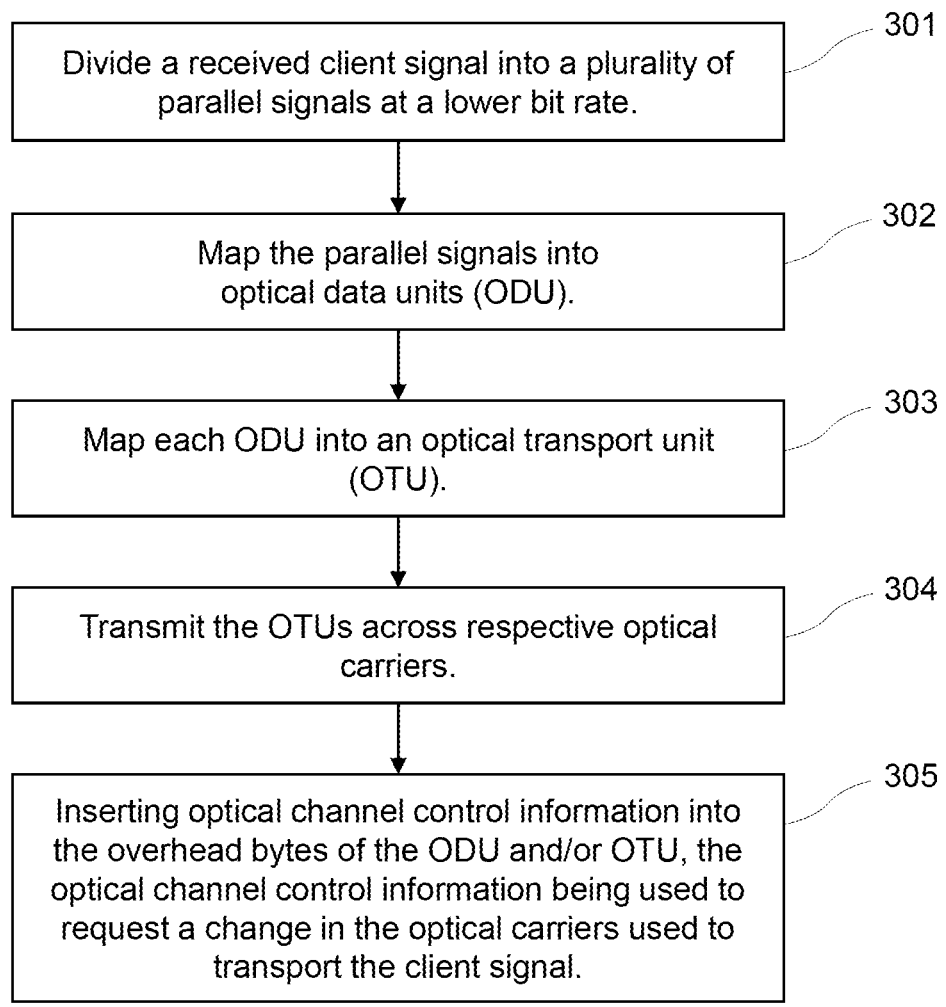
FIG. 9 shows a method which can be performed at the first node of FIG. 8A.

FIG. 9 shows a method of transporting a client signal across an optical transport network (OTN), which can be performed by one of the nodes 11, 12. Step 301 comprises dividing a received client signal into a plurality of parallel signals at a lower bit rate. Step 302 comprises mapping the parallel signals into a respective number of optical data units, ODU, each having payload bytes and overhead bytes. Step 303 comprises mapping each ODU into a respective optical transport unit, OTU, having payload bytes and overhead bytes. Step 304 comprises transmitting the OTUs across respective optical carriers. Step 305 comprises inserting optical channel control information into the overhead bytes of the ODU and/or OTU, the optical channel control information being used to request a change in the optical carriers used to transport the client signal.

Figure 10:
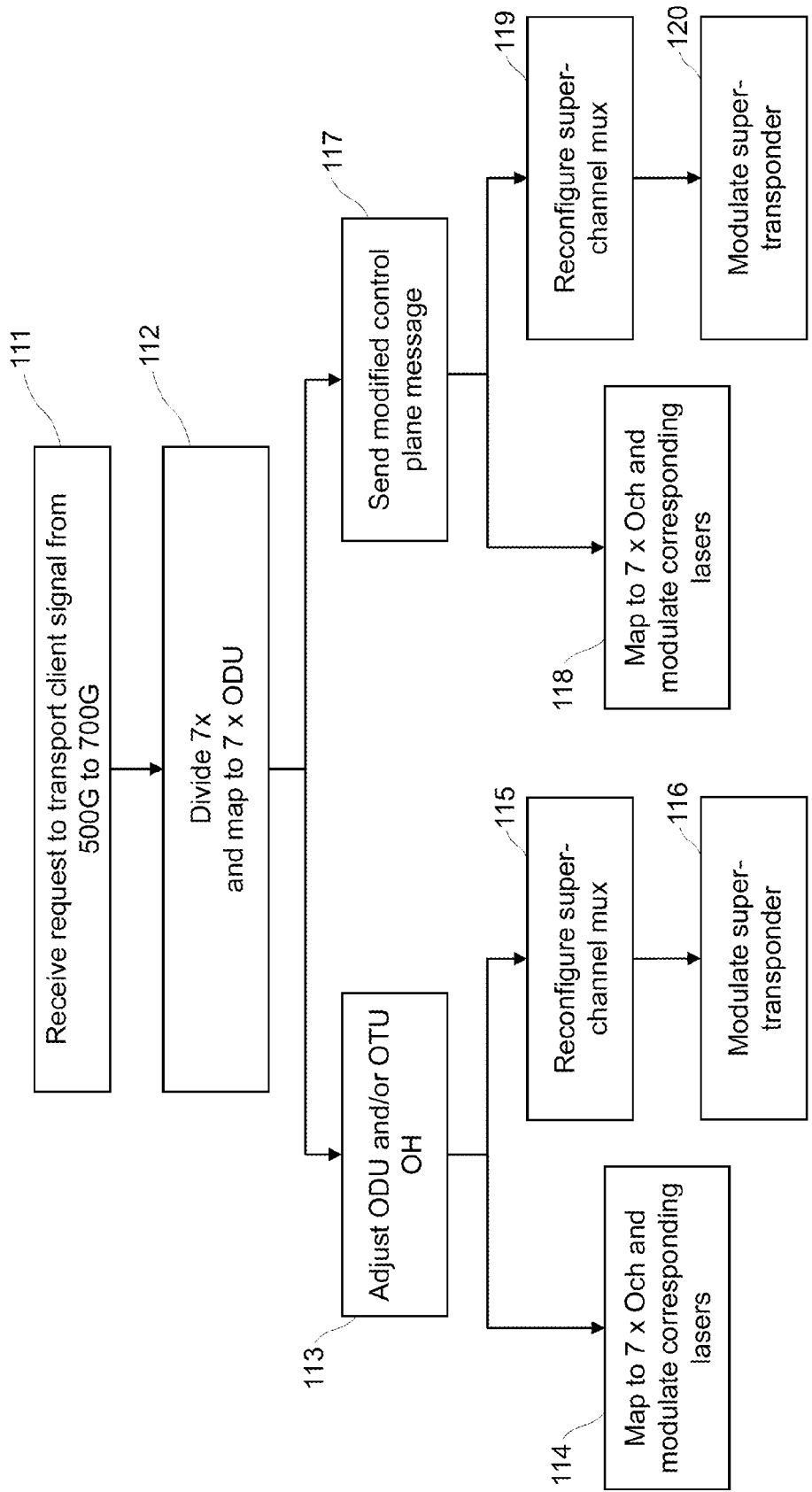
FIG. 10 shows a method of implementing the change of optical channels structure.

FIG. 10 shows a method of implementing changes to the optical channels structure, whether these are implemented using the super-channel embodiment or the separate optical channels DWDM embodiment. In this particular example a request to increase the client signal transport from 500 G to 700 G is received at step 111. However, many alternative requests could also be accommodated as would be appreciated by those skilled in the art. The method can be implemented by the channel manager entity, which may receive the request upon completion of the method of FIG. 6, for example. At step 112 the channel manager 31 instructs the demux/divider to split the incoming client signal into seven parallel streams of 100 G and to map these into seven ODU4 streams. At step 113 the method adjusts the OCCI input into the ODU/OTU OH. For example, the OCCI can indicate which optical channels are being used and in which order so that the client signal can be correctly reconstituted. At steps 115, 116 the method then reconfigures the super-channel mux and super-transponder as appropriate. Alternatively, if a standard DWDM optical system is used, at step 114 the method maps seven OTU4 are mapped to seven OCh4 which are used to modulate seven separate wavelength lasers, as is known.

Alternatively, at step 117 the OCCI may be forwarded using control plane or management plane messaging in an out-of-band signal. At steps 119, 120 the method then reconfigures the super-channel mux and super-transponder as appropriate. Alternatively, if a standard DWDM optical system is used, at step 118 the method maps seven OTU4 are mapped to seven OCh4 which are used to modulate seven separate wavelength lasers.

Figure 11:
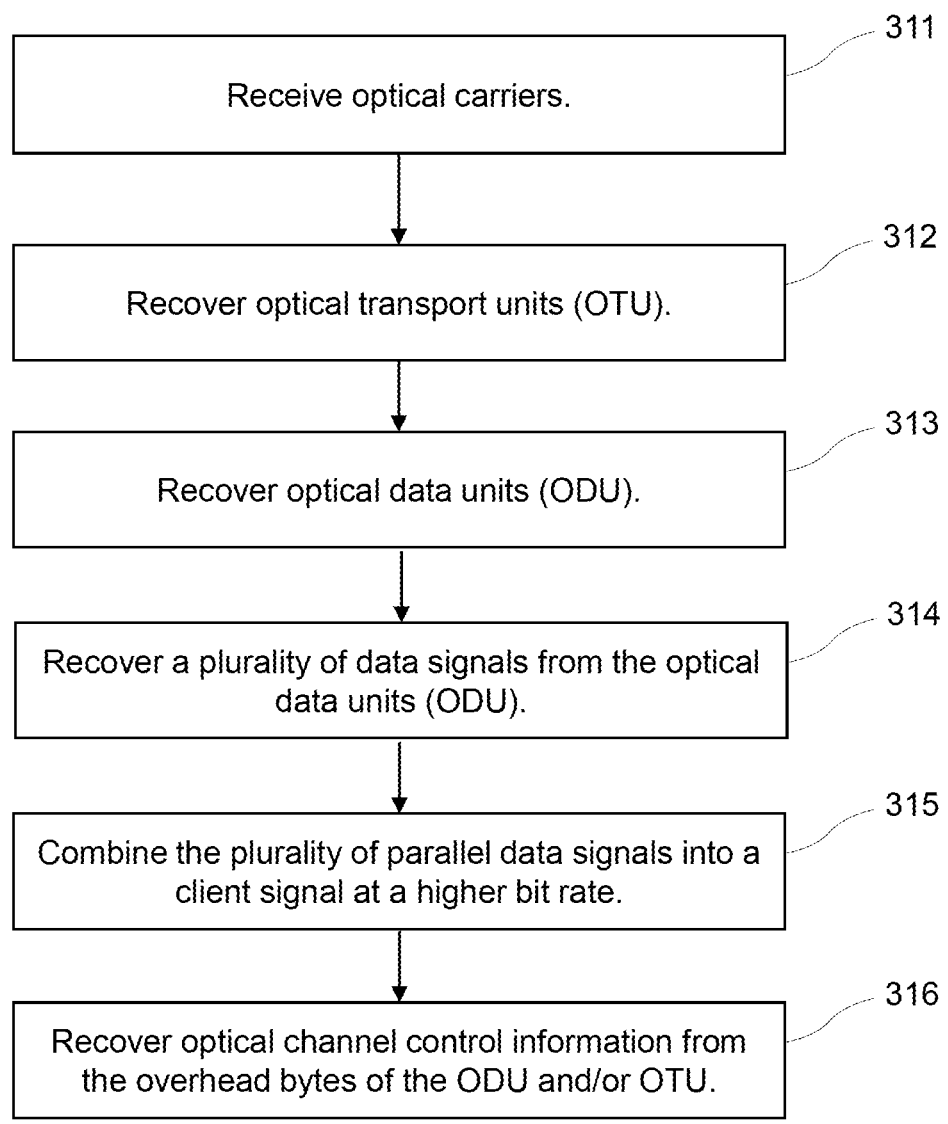
FIG. 11 shows a method which can be performed at the second node of FIG. 8B.

A method of receiving a signal from an optical transport network (OTN) is shown in FIG. 11. The method can be performed by one of the nodes 11, 12. Step 311 comprises receiving optical carriers. Step 312 comprises recovering optical transport units, OTU, each having payload bytes and overhead bytes. Step 313 comprises recovering optical data units, ODU, each having payload bytes and overhead bytes and can also include performing de-skewing. Step 314 comprises recovering a plurality of parallel data signals from the ODUs. Step 315 comprises combining the plurality of parallel data signals into a client signal at a higher bit rate. Step 316 comprises recovering optical channel control information from the overhead bytes of the ODU and/or OTU, the optical channel control information being used to manage and/or control the transport of the client signal using the super-channel.

Whilst various examples have been given, the invention is not so limited. For example any number of optical channels may be used, not just four optical channels for a 400 G client signal. Similarly ODU3/OTU3, ODU5/OTU5 or other variations of OTN containers could alternatively be used.

Figure 12A:
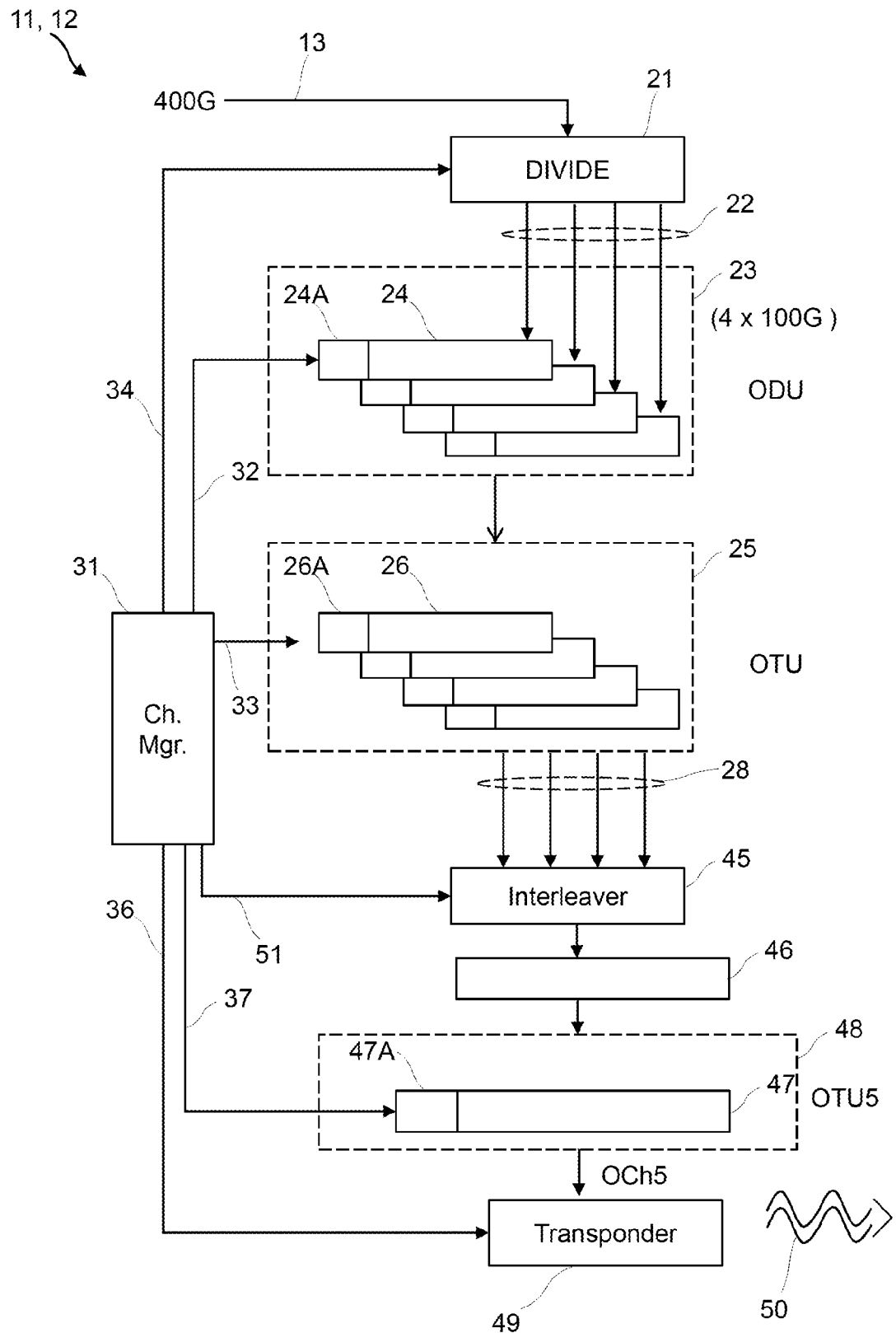
FIGS. 12A and 12B show apparatus at a first node and a second node of FIG. 1 where client traffic is carried using a wide carrier, such as a carrier modulated with an ODU5/OTU5.
Figure 12B:
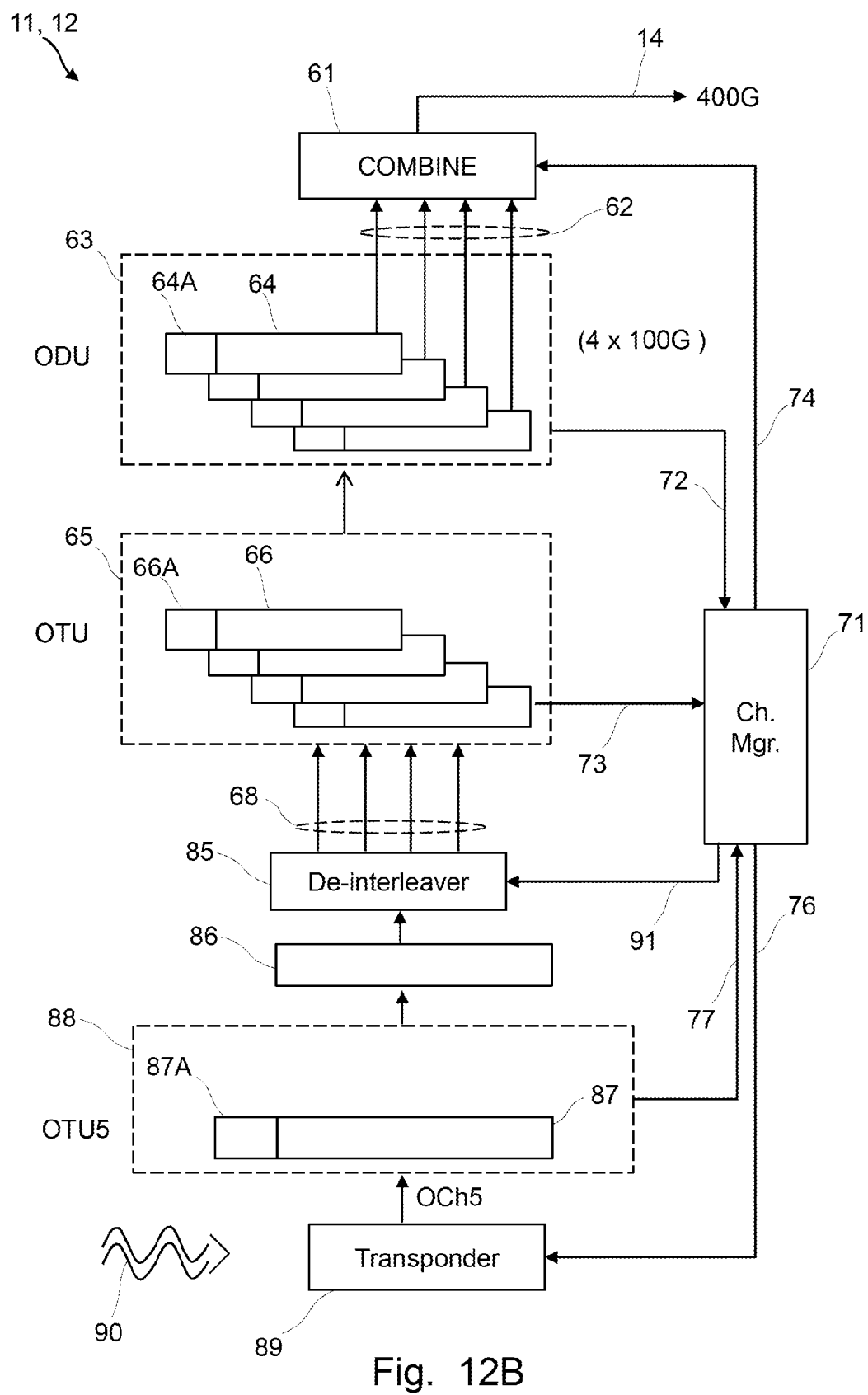

A further alternative embodiment is shown in FIGS. 12A and 12B, which utilises OTU5 containers from recent developments in the ITU-T G.709 standard. OTU5 are the next higher rate transport container for OTN as defined by G.709. Whilst the exact definition of the data rate to be used by ODU5 is still to be agreed, this will be significantly higher than the current highest OTU4 container which can support 100 G client signals over a single optical carrier. It is anticipated that ODU5 will support either 400 G or 1T (1000 G) client signals and will be capable of carrying multiple ODU4 containers. The current G.709 living list (Version 2011-05) is available from ITU-T and details the current specification options for ODU5 in more detail. However these will follow the G.709 principles for earlier defined data rates so that the skilled person will be fully understanding of the use of ODU5 as described in this embodiment.

In a similar manner to the embodiments of FIGS. 2A, 2B and 8A, 8B, the incoming client signal 13 is divided 21 into four parallel digital signals 22 which are mapped 23 into four ODU4 containers 24. These ODU4 are then mapped 25 into OTU4 containers 26 according to G.709. The channel manager entity 31 inserts OCCI into the overheads 24A, 26A of the ODU4 and/or OTU4 as previously described. The four OTU4 are then input to an interleaver 45 which bit, byte or block interleaves the four parallel OTU4 signals into a single digital stream 46 which is then mapped 48 into the payload bytes of an OTU5 container 47. As per G.709, overhead bytes 47A are added. The OTU5 container 47 shown corresponds to a 400 G data rate, however other container sizes could alternatively be used with the number of OTU4 containers added adjusted accordingly as would be appreciated by those skilled in the art. The OTU5 are then further processed according to G.709 in a manner corresponding to how older OTU containers are processed (e.g. OTU4, OTU3 etc.)—for example processing into OCh5. The OTU5 containers are applied to a super-carrier transponder which generates a wide bandwidth optical carrier modulated by the OTU5 data. As will be appreciated, a wider bandwidth optical signal allows a higher data rate signal to be transported using the same modulation rate and type.

FIG. 12B shows apparatus at one of the nodes 11, 12 which receives the optical signal 90 at a transponder/receiver 89 and recovers the higher rate (e.g. OTU5) container. A bitstream 86 is recovered from the higher-rate containers 87 and the bitstream is de-interleaved 85 to a parallel set of lower-rate OTUs (e.g. OTU4). These containers are demapped 65 into four ODU4 which are fed to the mux/combiner 61 to reconstitute the client signal 14. The channel manager 71 of the second node 12 recovers 72, 73, 77 the OCCI from one or more of the ODU/OTU OH 64A, 66A, 87A.

Figure 13:
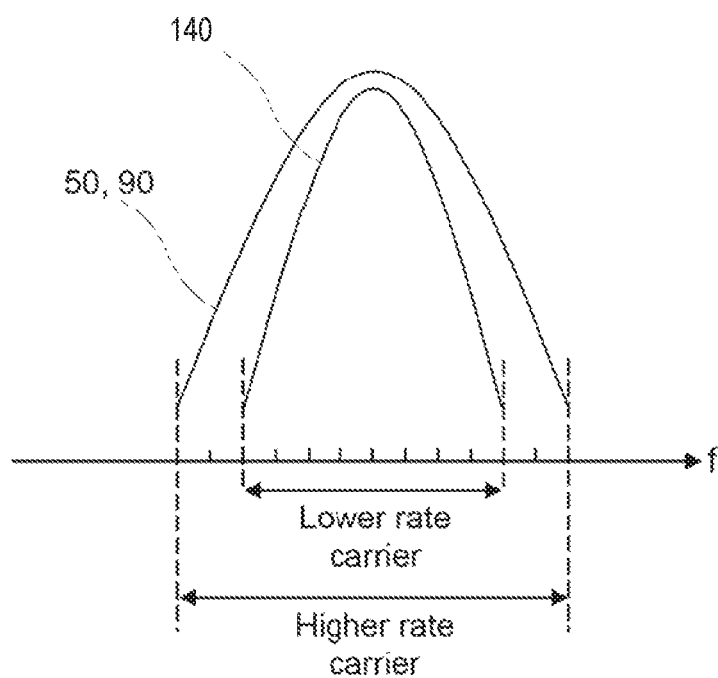
FIG. 13 shows a carrier for use in the embodiment of FIGS. 12A and 12B.

FIG. 13 shows a wide bandwidth optical carrier 50, 90 which can be used to carry the higher data rate signal, such as an OTU5, and a conventional, narrower bandwidth, optical carrier 140 which can be used to carry a lower rate signal. As an example, a conventional 100 G signal can have a bandwidth of 50 GHz while the higher rate signal can have a bandwidth of 75 GHz, although other carrier bandwidths can be used.

G.709 is associated with a grid of optical wavelengths which are used to carry ODU4 signals. This grid is defined in ITU-T G.694 and specifies the frequency grid, anchored to 193.1 THz. This supports a variety of channel spacings ranging from 12.5 GHz to 100 GHz. The wavelengths of the optical carriers fit within these spacings. The super-carrier has a wavelength broader than what would be used for the optical carriers and spans multiple defined spacings.

Using a super-carrier with a wavelength wider than the optical carrier wavelengths provides an alternative to using higher order modulation and/or higher optical bit rates to carry higher data rate signals like OTU5. This eases the requirements on optical components making them cheaper to implement. The super-carrier can co-exist with conventional carriers in the OTN 10.

The super-carrier is received by a super-carrier transponder at the egress node and the OTU5 recovered using known G.709 technology. The OTU5 payload is de-interleaved to recover the original parallel OTU4 signals. These are de-mapped into 4 ODU4 signals which are combined to generate the original 400 G client signal. Signal processing and de-skewing/alignment of the individual signals are performed as necessary.

Meanwhile, the egress node's channel manager entity recovers OCCI from the overheads of the OTU and/or ODU as previously described. This allows for management as well as control of the super-carrier—for example to change the wavelength to accommodate a different size client signal.

As with the other embodiments, the specific examples given are not limiting, and could be altered—for example ten interleaved OTU4 could be mapped into a suitably sized OTU5.

Figure 14:
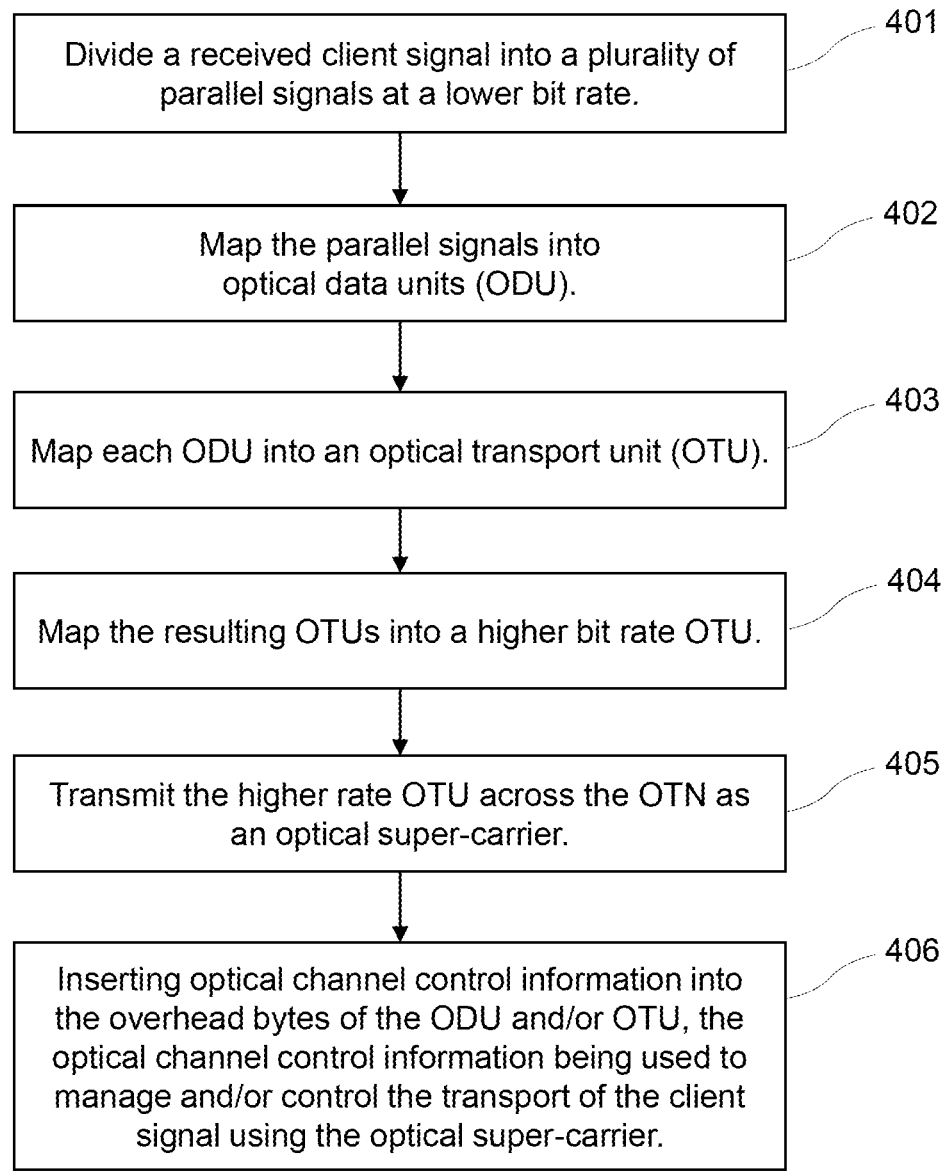
FIG. 14 shows a method which can be performed at the first node of FIG. 12A.

FIG. 14 shows a method of transporting a client signal across an optical transport network (OTN) which can be performed by one of the nodes 11, 12. Step 401 comprises dividing a received client signal into a plurality of parallel signals at a lower bit rate. Step 402 comprises mapping the parallel signals into a respective number of optical data units, ODU, each having payload bytes and overhead bytes. Step 403 comprises mapping each ODU into a respective optical transport unit, OTU, having payload bytes and overhead bytes. Step 404 comprises mapping the resulting OTUs into a higher bit rate OTU having payload bytes and overhead bytes. Step 405 comprises transmitting the higher rate OTU across the OTN as an optical super-carrier, the optical super-carrier having a bandwidth wider than the bandwidth of an optical carrier normally allocated to transmitting a lower rate OTU across the OTN. Step 406 comprises inserting optical channel control information into the overhead bytes of the ODU and/or OTU, the optical channel control information being used to manage and/or control the transport of the client signal using the optical super-carrier.

Figure 15:
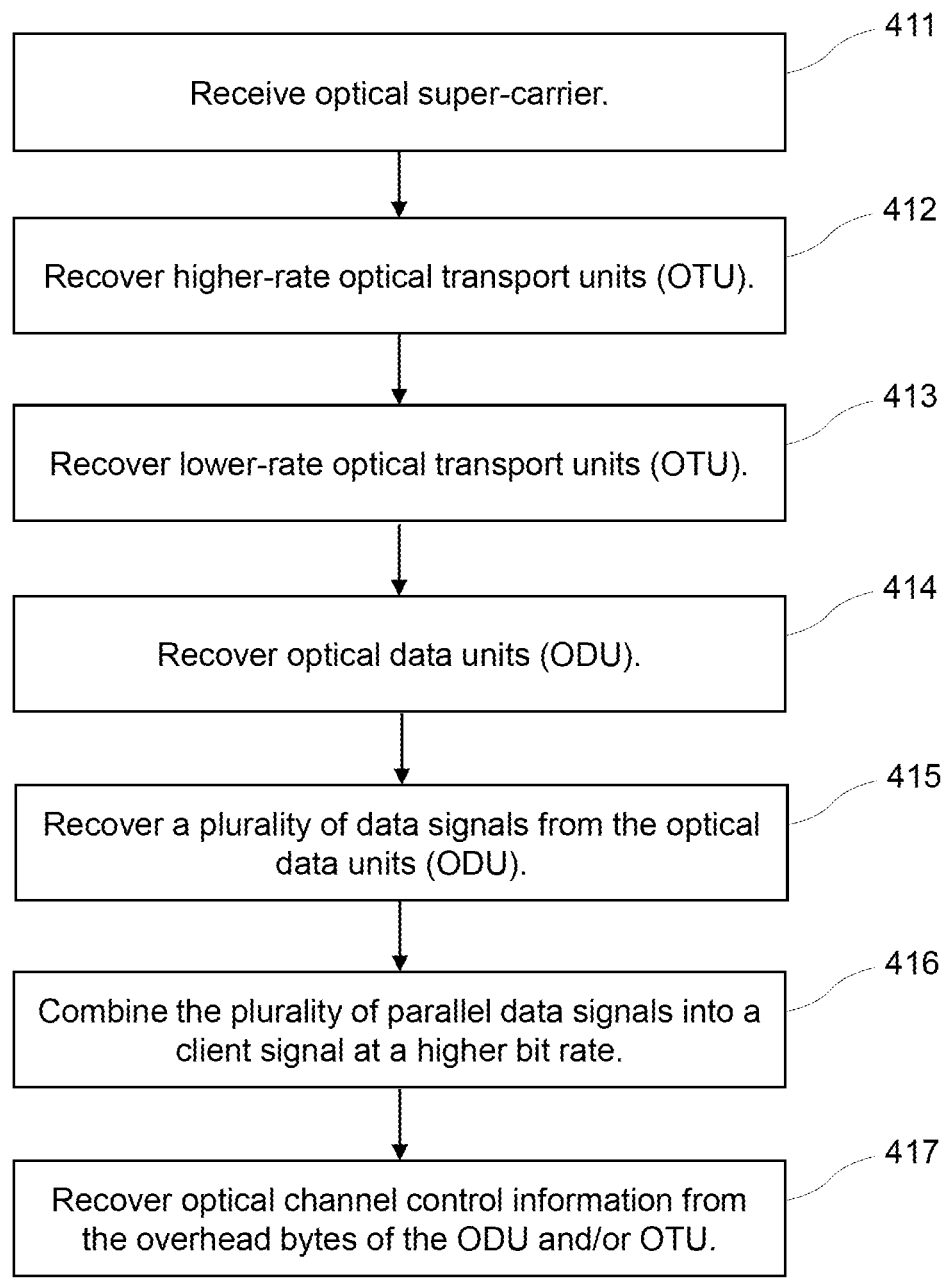
FIG. 15 shows a method which can be performed at the second node of FIG. 12B.

A method of receiving a signal from an optical transport network (OTN) is shown in FIG. 15. The method can be performed by one of the nodes 11, 12. Step 411 comprises receiving an optical super-carrier having a bandwidth wider than a bandwidth of an optical carrier normally allocated to transmitting a lower rate OTU across the OTN. Step 412 comprises recovering higher-rate optical transport units, OTU, each having payload bytes and overhead bytes. Step 413 comprises recovering lower-rate optical transport units, OTU, each having payload bytes and overhead bytes. Step 414 comprises recovering optical data units, ODU, each having payload bytes and overhead bytes. Step 415 comprises recovering a plurality of parallel data signals from the ODUs. Step 416 comprises combining the plurality of parallel data signals into a client signal at a higher bit rate and performing any de-skewing processing, if required. Step 417 comprises recovering optical channel control information from the overhead bytes of the ODU and/or OTU, the optical channel control information being used to manage and/or control the transport of the client signal using the optical super-carrier.

Figure 16:
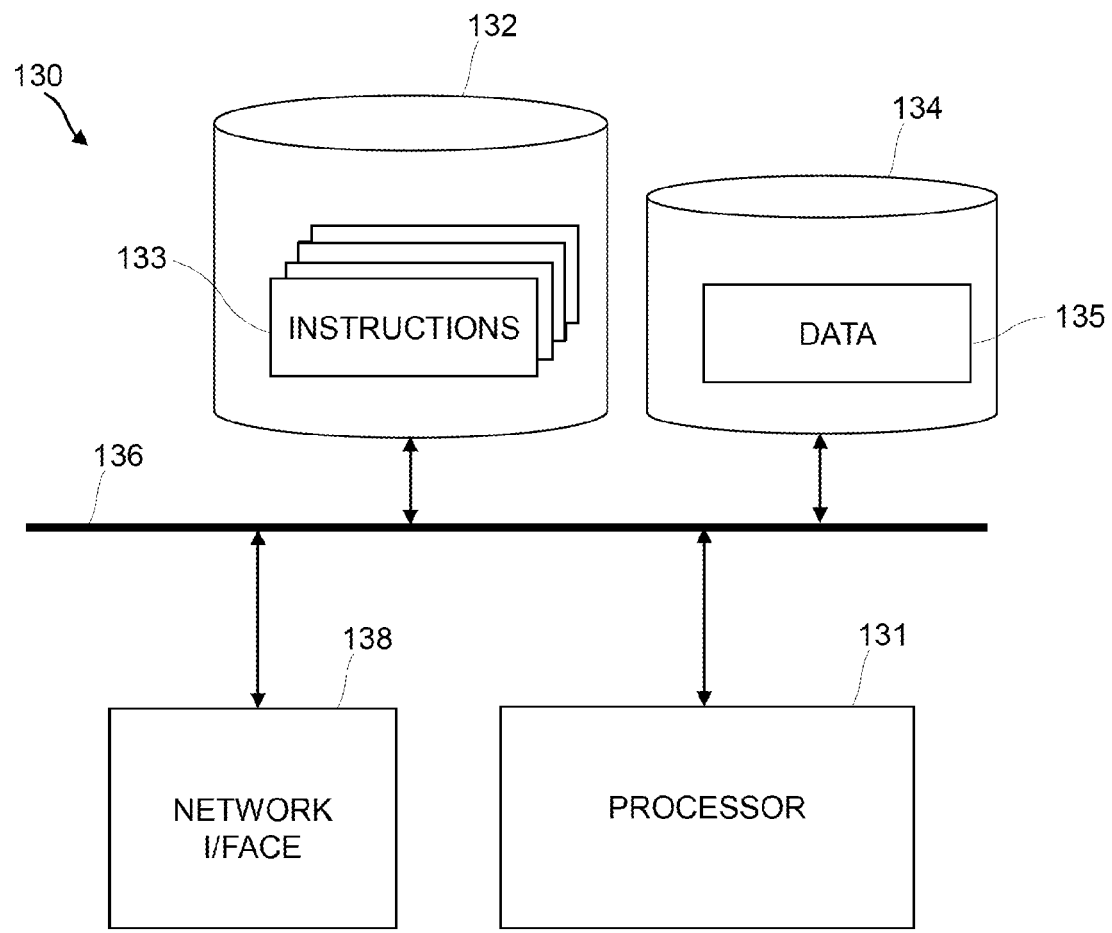
FIG. 16 shows processing apparatus for a computer-based implementation.

FIG. 16 shows an exemplary processing apparatus 130 which may be implemented as any form of a computing and/or electronic device, and in which embodiments of the system and methods described above may be implemented. Processing apparatus 130 can be provided at one of the nodes 11, 12. Processing apparatus may implement any of the methods described above. Processing apparatus 130 comprises one or more processors 131 which may be microprocessors, controllers or any other suitable type of processors for executing instructions to control the operation of the device. The processor 131 is connected to other components of the device via one or more buses 136. Processor-executable instructions 133 may be provided using any computer-readable media, such as memory 132. The processor-executable instructions 133 can comprise instructions for implementing the functionality of the described methods. The memory 132 is of any suitable type such as read-only memory (ROM), random access memory (RAM), a storage device of any type such as a magnetic or optical storage device. Additional memory 134 can be provided to store data 135 used by the processor 131. The processing apparatus 130 comprises one or more network interfaces 138 for interfacing with other network entities, such as other nodes 11, 12 of the network 10.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of transporting a client signal across an optical transport network, the method comprising:
   dividing a received client signal into a plurality of parallel signals at a lower bit rate;
   mapping the parallel signals into a respective number of optical data units (ODUs), each ODU having payload bytes and overhead bytes;
   mapping each ODU into a respective optical transport unit (OTU) having payload bytes and overhead bytes;
   transmitting the OTUs across respective optical carriers of a super-channel, the optical carriers of the super-channel being synchronously modulated; and
   inserting optical channel control information into the overhead bytes of the ODU and/or OTU, the optical channel control information being used to manage and/or control the transport of the client signal using the super-channel, wherein the optical channel control information in the overhead bytes of the ODU and/or OTU includes a request of change of the synchronously modulated optical carriers of the super-channel.

2. The method according to claim 1, wherein the optical carriers of the super-channel are constructed according to ITU-T standard G.709.

3. The method according to claim 1, wherein the super-channel is transmitted using a single laser.

4. The method according to claim 3, wherein the super-channel comprises multiple frequency-locked carriers using coherent optical orthogonal frequency-division multiplexing (CO-OFDM).

5. The method according to claim 1, wherein the optical channel control information identifies at least one of: which optical carriers are used to carry the respective OTU, information about structure, information about modulation type, and management information about the signals transported.

6. The method according to claim 1, wherein the change comprises at least one of: adding sub-carriers, subtracting sub-carriers, and re-allocating the same number of sub-carriers.

7. The method according to claim 1, further comprising controlling at least one of the steps of: the dividing the received client signal into the plurality of parallel signals, the mapping the plurality of parallel signals into the respective number of ODUs, the mapping each ODU into the respective OTU and the transmitting the OTU across respective optical carriers of a super-channel.

8. The method according to claim 7, wherein the at least one of the steps controlled are performed upon receiving an acknowledgement from a node.

9. A method of receiving a signal from an optical transport network, the method comprising:
   receiving optical carriers of a super-channel, the optical carriers of the super-channel being synchronously modulated;
   recovering optical transport units (OTUs), each OTU having payload bytes and overhead bytes;
   recovering optical data units (ODUs), each ODU having payload bytes and overhead bytes;
   recovering a plurality of parallel data signals from the ODUs;
   combining the plurality of parallel data signals into a client signal at a higher bit rate; and
   recovering optical channel control information from the overhead bytes of the ODU and/or OTU, the optical channel control information being used to manage and/or control the transport of the client signal using the super-channel, wherein the optical channel control information in the overhead bytes of the ODU and/or OTU includes a request of change of the synchronously modulated optical carriers of the super-channel.

10. An apparatus for use at a node for transporting a client signal across an optical transport network comprising:
    a demultiplexer arranged to divide a received client signal into a plurality of parallel signals at a lower bit rate;
    an optical data unit (ODU) mapper arranged to map the parallel signals into a respective number of ODUs, each ODU having payload bytes and overhead bytes;
    an optical transport unit (OTU) mapper arranged to map each ODU into a respective OTU having payload bytes and overhead bytes;
    a transponder arranged to transmit the OTUs across respective optical carriers of a super-channel, the optical carriers of the super-channel being synchronously modulated; and
    a channel manager arranged to insert optical channel control information into the overhead bytes of the ODU and/or OTU, the optical channel control information being used to manage and/or control the transport of the client signal using the super-channel, wherein the optical channel control information in the overhead bytes of the ODU and/or OTU includes a request of change of the synchronously modulated optical carriers of the super-channel.

11. An apparatus for use at a node for receiving a signal from an optical transport network comprising:
    a receiver arranged to receive optical carriers of a super-channel, the optical carriers of the super-channel being synchronously modulated;
    a demultiplexer arranged to recover optical transport units (OTUs), each OTU having payload bytes and overhead bytes;
    an OTU de-mapper arranged to recover optical data units (ODUs), each ODU having payload bytes and overhead bytes from the OTUs;
    an ODU de-mapper arranged to recover a plurality of parallel data signals from the ODUs;
    a multiplexer arranged to combine the plurality of parallel data signals into a client signal at a higher bit rate; and
    a channel manager arranged to recover optical channel control information from the overhead bytes of the ODU and/or OTU, the optical channel control information being used to manage and/or control the transport of the client signal using the super-channel, wherein the optical channel control information in the overhead bytes of the ODU and/or OTU includes a request of change of the synchronously modulated optical carriers of the super-channel.

12. A method of transporting a client signal across an optical transport network in a first node, the method comprising:
    dividing a received client signal into a plurality of parallel signals at a lower bit rate;
    mapping the parallel signals into a respective number of optical data units (ODUs), each ODU having payload bytes and overhead bytes;
    mapping each ODU into a respective optical transport unit (OTU) having payload bytes and overhead bytes;
    transmitting the OTUs across respective optical carriers of a super-channel, the optical carriers of the super-channel being synchronously modulated; and inserting optical channel control information into the overhead bytes of the ODU and/or OTU, the optical channel control information being used to manage and/or control the transport of the client signal using the super-channel, wherein the optical channel control information in the overhead bytes of the ODU and/or OTU includes a request to increase a number of the optical carriers of the super-channel.

13. The method according to claim 12, wherein the optical channel control information is received by a second node, wherein the second node provides a positive acknowledgement to the first node up determining the second node can accommodate the requested increase of the number of the optical carriers of the super-channel.

14. The method according to claim 13, further comprising:
upon receiving the positive acknowledgement at the first node,
   dividing the received client signal into the increased number of parallel signals;
   mapping the parallel signals into the increased number of optical data units (ODUs), each ODU having payload bytes and overhead bytes;
   mapping each ODU into a respective optical transport unit (OTU) having payload bytes and overhead bytes; and
   transmitting the OTUs across respective optical carriers of the super-channel, the optical carriers of the super-channel being synchronously modulated, wherein the number of the optical carriers is the increased number.

\* \* \* \* \*